United States Patent [19]

Marx et al.

[11] 4,172,193

[45] Oct. 23, 1979

[54] CATHODIC ELECTROCOATING BINDERS

[75] Inventors: Matthias Marx, Bad Durkheim; Erich Gulbins, Heidelberg-Neuenheim, both of Fed. Rep. of Germany

[73] Assignee: BASF Aktiengesellschaft, Fed. Rep. of Germany

[21] Appl. No.: 945,880

[22] Filed: Sep. 26, 1978

[30] Foreign Application Priority Data

Oct. 1, 1977 [DE] Fed. Rep. of Germany ....... 2744360

[51] Int. Cl.$^2$ ............................................. C08G 59/14
[52] U.S. Cl. ............................. 528/104; 204/181 C; 260/29.2 EP; 528/45; 528/107; 528/227; 525/406; 525/489; 525/512
[58] Field of Search ...................... 528/104, 107, 227; 260/29.2 EP

[56] References Cited

U.S. PATENT DOCUMENTS

| | | | |
|---|---|---|---|
| 2,801,222 | 7/1957 | Greer | 260/2.1 |
| 3,637,597 | 1/1972 | Jalics | 260/65 |
| 3,936,413 | 2/1976 | Würmb et al. | 260/40 R |
| 4,076,676 | 2/1978 | Sommerfeld | 260/29.4 R |
| 4,101,486 | 7/1978 | Bosso et al. | 260/29.2 TN |

OTHER PUBLICATIONS

Tokyo Shibaura Electric, Ltd., Derwent Abstract of Japan Pat. No. 74/129539.
Tanimoto et al., "Polymers Having Mannich Base Groups", Chemical Abstracts 69, 78078a, (1968).
Pogosyan et al., "Styrene Derivatives", Chemical Abstracts 72, 89971z, (1970).

*Primary Examiner*—Earl A. Nielsen
*Attorney, Agent, or Firm*—Keil & Witherspoon

[57] ABSTRACT

Cathodic electrocoating binders based on polycondensation products which contain amino groups and which are, at least partially, in the form of their ammonium salts or quaternary ammonium salts.

The polycondensation products containing amino groups are obtained by adduct formation of p-hydroxyacetophenone with polymers containing epoxide groups, followed by reaction of these adducts with formaldehyde and a secondary amine.

The electrocoating binders of the invention may be used for coating metallic substrates and give coatings which are particularly corrosion-resistant and adhere particularly firmly.

6 Claims, No Drawings

CATHODIC ELECTROCOATING BINDERS

The present invention relates to cathodic electrocoating binders based on polycondensation products which contain amino groups and which are, at least partially, in the form of their ammonium salts or quaternary ammonium salts.

Cathodic electrocoating binders are already known and have been described in a number of patents.

The corrosion protection afforded by coatings produced from aqueous coating compositions is essentially limited by hydrophilic groups which remain in the binders even after baking.

It is an object of the present invention to provide cathodic electrocoating binders which give particularly advantageous baked finishes and which provide improved corrosion protection.

We have found that this object is achieved, according to the invention, if the polycondensates used as binders contain β-aminoketone groups.

The present invention relates to cathodic electrocoating binders based on polycondensation products which contain amino groups and which, at least partially, are in the form of their ammonium salts or quaternary ammonium salts, wherein the polycondensation products containing amino groups have been obtained by adduct formation of p-hydroxyacetophenone with polymers containing epoxide groups, followed by reaction of these adducts with formaldehyde and a secondary amine.

Preferred cathodic electrocoating binders according to the invention are those where the polycondensation products containing amino groups have a nitrogen content of from 0.1 to 15 percent by weight.

Combinations of the surface-coating binders of the invention with aminoplast resins, phenoplast resins, epoxy resins or modified resins of these types are also preferred.

Polymers with β-aminoketone groups have already been described in another context. For example, German Published Application DAS No. 1,023,583 discloses the preparation, by free radical chain polymerization, of crosslinked polymers with aminoketone groups, which contain the nitrogen in a quaternary form. These polymers are used as ion exchangers. They cannot be used for surface-coating purposes since they are insoluble.

Japanese Pat. No. 9,129,539 discloses copolymers with aminoketone groups, prepared using free radical initiators, which are used for the manufacture of electrophotographic developers.

Polystyrenes with aminoketone groups in the p-position are disclosed in Chemical Abstracts 72, 89971 Z and 69, 78078a.

However, none of these publications discloses polycondensation products, containing β-aminoketone groups, which can be used as aqueous surface-coating binders.

Polymeric β-amino-esters, as described, for example, in German Pat. No. 2,223,241, are also unsuitable for use as cathodic electrocoating binders, since they are insufficiently stable in aqueous solution and since, on aging of the electrocoating baths, the coating in part begins to deposit on the anode instead of on the cathode.

In contrast, the cathodic electrocoating binders according to the present invention give stable electrocoating baths which conform to requirements even on aging.

A particular advantage of the binders according to the invention is that the baked finishes obtained therewith provide excellent corrosion protection. On thermal curing of the finish, the hydrophilic groups of the binder are eliminated and hydrophobic coatings which cannot be attacked by aqueous agents are obtained.

The polycondensation products, containing β-aminoketone groups, of the invention are prepared by adduct formation of p-hydroxyacetophenone with polymers containing epoxide groups, followed by reaction with formaldehyde and a secondary amine.

Suitable polymers with epoxide groups for the preparation of the novel binders are glycidyl ethers of polyhydric alcohols and phenols, eg. glycidyl ethers of glycol, polyethylene glycols, propylene glycol, polypropylene glycols, 1,4-butylene glycol, 1,5-pentanediol, 1,6-hexanediol, 1,3,6-hexanetriol, glycerol, pentaerythritol, bis-(4-hydroxyphenyl)-2,2-propane, 4,4'-dihydroxybenzophenone, bis-(2-hydroxynaphthyl)-methane, 1,5-hydroxynaphthalene and bis-(4-hydroxyphenyl)-1,1-isobutane.

Commercially available polymeric epoxy resins based on 2,2-bis-(4-hydroxyphenyl)-propane and epichlorohydrin are particularly suitable.

Epoxy resins of the type of glycidyl isocyanurate, for example triglycidyl isocyanurate, are also suitable.

p-Hydroxyacetophenone is generally reacted with the polymers containing epoxide groups in a molar ratio of from 0.5:1 to 1:1 (p-hydroxyacetophenone:epoxide group), preferably 1:1.

Particularly suitable secondary amines are aliphatic amines, eg. dimethylamine, methylethylamine, diethylamine and the like. Aliphatic amines which carry no further functional groups are preferred. The reaction can very easily also be carried out with amines which carry functional groups but as a rule this does not offer any advantages in the present process. In some cases, the improved solubility or dispersibility of the reaction products in water, achieved by the presence of OH groups, may be desirable.

Formaldehyde is either used as such, with or without dissolution in water or a lower alcohol, eg. in n-butanol, or in the form of formaldehyde donors, eg. paraformaldehyde.

In general, the secondary amine and formaldehyde are reacted with the adduct of p-hydroxyacetophenone plus polymer containing epoxide groups in a molar ratio of from 0.5 to 1, preferably about 1, mole of secondary amine and from 0.5 to 1.2, preferably about 1, mole of formaldehyde per mole of the p-hydroxyacetophenone contained in the adduct.

The content of β-aminoketone groups in the binder according to the invention can vary within wide limits, for example within limits which correspond to a nitrogen content of the polymer or polycondensate of from 0.1 to 15, preferably from 0.5 to 10, especially from 1 to 5, percent by weight, based on the polycondensate.

Examples of preferred surface-coating binders according to the invention are reaction products based on epoxy resins or epoxy resin derivatives obtained by reaction of epoxy resins with p-hydroxyacetophenone, formaldehyde and secondary amines.

The polymeric bases containing β-aminoketone groups can be rendered dilutable with water, or genuinely water-soluble, by partial or complete neutralization with inorganic or organic acids or by quaternization, for example as described in German Published Application DAS No. 1,023,583. A preferred form of quaternization comprises reaction with an epoxide, for example by such methods as those described in German Published Application DAS No. 1,023,583, or with ethylene oxide, propylene oxide, butylene oxide, glycidol or higher molecular weight monoepoxides, such as are obtained from diepoxides or polyepoxides by partial blocking of epoxide groups by adduct formation with a proton-active compound (eg. phenol, or a mercaptan, amine or acid).

Suitable reactants for neutralization or partial neutralization of the β-aminoketone polycondensates are inorganic acids, eg. phosphoric acid, boric acid, sulfuric acid or hydrogen chloride, or, preferably, organic acids, eg. formic acid, acetic acid, propionic acid, butyric acid or lactic acid.

The binders of the invention may be used for the manufacture of aqueous baking finishes, especially for cathodic electrocoating compositions. On baking at 140° C. or above, the binder loses the hydrophilic character attributable to the basic groups. The coatings obtained from such binders afford improved corrosion protection, and the binder is more easily crosslinkable, if the crosslinking takes place by acid catalysis.

The binders according to the invention may be crosslinkable by extraneous molecules, or self-crosslinkable. Crosslinking may take place via amide, methylol, methylol-ether, methyleneamimo, or hydroxyl groups and the like, which are present in the polymeric binders. Crosslinking agents capable of reacting with the reactive groups of the polymeric binder are especially aminoplast resins, phenoplast resins and blocked isocyanates.

In order to modify certain technical properties, such as the rinse-resistance of the wet coating, the throwing power or the pigment wetting, further binders may be incorporated in the composition, eg. polyesters, alkyd resins, cellulose derivatives, drying or non-drying oils, natural resins, eg. unmodified or modified rosin, and synthetic copolymers with or without reactive groups.

Organic solvents, eg. alcohols, including higher alcohols, esters, ketones and aromatics, may also be present in minor amounts, in order to improve the deposition characteristics, and the surface quality, of electrophoretically deposited films.

The aqueous solutions or dispersions of the polycondensation products of the invention, which are at least partially in the form of salts, may contain other auxiliaries which can be deposited electrophoretically as a mixture with the polycondensates, eg. pigments, soluble dyes, high-boiling solvents, stabilizers, anti-foam agents and other auxiliaries and adjuvants.

The electrophoretic deposition takes place from an aqueous medium, at a cathode. Advantageously, the coating composition is diluted with water or a water/solvent mixture to a solids content of from 8 to 20 percent by weight. The deposition voltages may range from a few volt to several thousand volt, but are as a rule from 100 to 600 volt. After rinsing the film deposited on the electrically conductive cathode, baking of the film takes place at from about 140° to 190° C. for from 10 to 30 minutes.

The coating compositions of the invention give coatings which afford excellent corrosion protection and exhibit excellent adhesion both on iron-phosphatized or zinc-phosphatized, and on untreated, metallic substrates. The particular advantage of the novel binders over conventional binders is that on crosslinking the surface-coating films harden thoroughly, with methylol, methylol-ether, OH and COOH groups being involved, at relatively low baking temperatures. In contrast, hardening of conventional cationic surface-coating binders frequently requires very high temperatures and relatively long baking times.

In the Examples, parts and percentages are by weight, unless stated otherwise.

EXAMPLE 1

760 parts of an epoxy resin which has been obtained by reacting 2,2-bis-(4-hydroxyphenyl)-propane with epichlorohydrin and has an epoxide value (moles of epoxide/100 g of resin) of 0.53 are reacted with 544 parts of 4-hydroxy-acetophenone at 175° C. The melt of the reaction product is discharged onto a cooling belt. When it has cooled, the solid resin is milled (reaction product (I).

326 parts of this powder, 44 parts of dimethylamine, 33 parts of p-formaldehyde and 60 parts of glacial acetic acid are stirred at 80° C. until the resultingproduct has become water-soluble.

10 parts of the resulting reaction product and 3 parts of a water-insoluble phenoplast resin for crosslinking of baking finishes are homogeneously dissolved by addition of 4 parts of ethyl glycol, and the solution is ddispersed in water. A 10% strength dispersion of the binder mixture is introduced into anelectrocoating cell and a film is cathodically deposited on a zinc-phosphatized bodywork panel by applying a deposition voltage of 350 volt for 120 seconds. After baking for 30 minutes at 170° C., the film was 17 μm thick and had a hardness of 6 H. It was resistant to organic solvents and to aqueous alkali.

EXAMPLE 2

326 parts of reaction product I, 44 parts of dimethylamine, 33 parts of p-formaldehyde and 30 parts of glacial acetic acid are stirred at from 75° to 85° C. until the mixture has become water-soluble. 90 parts of water are then added and ethylene oxide is forced into a pressure vessel containing the mixture. 36 parts of ethylene oxide are taken up by the reaction mixture. 100 parts of a phenoplast resin conventionally used for baking finishes, 150 parts of butyl glycol and 30 parts of a polybutadiene oil are then added, after which the mixture is diluted with water to give a 10% strength surface-coating dispersion.

A bodywork panel treated with iron phosphate was cathodically coated in this dispersion for 2 minutes at a voltage of 350 V.

The film was then rinsed with a vigorous jet of demineralized water and baked for 30 minutes at 170° C. No detachment of the film occurred on rinsing, and the baked film was free from water spotting. The coating was 18 μm thick and adhered very firmly to the substrate. It provided very good corrosion protection both in the salt spray test according to ASTM B 117-64 and in various test arrangements for examining the filiform corrosion and scab corrosion.

EXAMPLE 3

A non-pretreated bodywork panel was cathodically electrocoated in the surface-coating dispersion described in Example 2, for 2 minutes at a voltage of 350 volt. The film was then rinsed with demineralized water as described in Example 2, and baked for 30 minutes at 170° C.

There is very little difference between the thickness of this coating and the surface-coating on iron-phosphatized panel; the coating is 20.5 μm thick.

Welds are also coated very uniformly compared to the surrounding zone, without frothing and blistering.

We claim:

1. A cathodic electrocoating binder based on polycondensation products which contain amino groups and which, at least partially, are in the form of their ammonium salts or quaternary ammonium salts, wherein the polycondensation products containing amino groups have been obtained by adduct formation of p-hydroxyacetophenone with polymers containing epoxide groups, followed by reaction of these adducts with formaldehyde and a secondary amine.

2. A cathodic electrocoating binder as claimed in claim 1, wherein the polycondensation product has a nitrogen content of from 0.1 to 15 percent by weight.

3. A cathodic electrocoating binder as claimed in claim 1, wherein the polycondensation product containing amino groups has been obtained by adduct formation of p-hydroxyacetophenone with polymers containing epoxide groups, in the molar ratio of from 0.5:1 to 1:1 (p-hydroxyacetophenone:epoxide group) and reaction of the adduct with a secondary amine and formaldehyde in the molar ratio of from 0.5 to 1 mole of secondary amine, and from 0.5 to 1.2 moles of formaldehyde, in each case per mole of p-hydroxyacetophenone contained in the adduct.

4. A cathodic electrocoating binder as claimed in claim 1, which contains an added aminoplast resin or phenoplast resin.

5. A cathodic electrocoating binder as claimed in claim 1, which contains an added epoxy resin.

6. A cathodic electrocoating binder as claimed in claim 1, wherein the polycondensation product has a nitrogen content of from 0.5 to 10 percent by weight, based on the polycondensation product.

* * * * *